United States Patent
Liu

(10) Patent No.: US 9,899,883 B2
(45) Date of Patent: Feb. 20, 2018

(54) WIRELESS POWER TRANSFER SYSTEM HAVING POSITIONING FUNCTION AND POSITIONING DEVICE AND METHOD THEREFOR

(71) Applicant: Kuo-Chi Liu, Hsinchu (TW)

(72) Inventor: Kuo-Chi Liu, Hsinchu (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 475 days.

(21) Appl. No.: 14/593,181

(22) Filed: Jan. 9, 2015

(65) Prior Publication Data

US 2016/0204616 A1 Jul. 14, 2016

(51) Int. Cl.
```
H01F 27/42    (2006.01)
H01F 37/00    (2006.01)
H01F 38/00    (2006.01)
H02J 50/90    (2016.01)
H02J 50/10    (2016.01)
```

(52) U.S. Cl.
CPC .............. *H02J 50/90* (2016.02); *H02J 50/10* (2016.02)

(58) Field of Classification Search
CPC .................................. H02J 50/10; H02J 50/90
USPC ......................................................... 307/104
See application file for complete search history.

(56) References Cited

U.S. PATENT DOCUMENTS

| | | | | |
|---|---|---|---|---|
| 8,339,097 B2* | 12/2012 | Kojima | ................... | H02J 7/025 320/106 |
| 9,070,505 B2* | 6/2015 | Saitoh | ..................... | H01F 38/14 |
| 2008/0093461 A1* | 4/2008 | Marushima | ........ | G06K 19/0723 235/492 |
| 2009/0072629 A1* | 3/2009 | Cook | ....................... | H02J 5/005 307/104 |
| 2010/0144402 A1* | 6/2010 | Watanabe | .......... | G06K 19/0723 455/572 |
| 2012/0280575 A1* | 11/2012 | Kim | ....................... | H02J 17/00 307/104 |
| 2012/0293009 A1* | 11/2012 | Kim | ..................... | H02H 7/1252 307/104 |
| 2013/0264887 A1* | 10/2013 | Arisawa | ............... | G01D 5/2006 307/104 |
| 2014/0265614 A1* | 9/2014 | Kim | ....................... | H01F 38/14 307/104 |
| 2015/0326028 A1* | 11/2015 | Suzuki | .................... | H02J 17/00 307/104 |
| 2016/0094043 A1* | 3/2016 | Hao | ........................ | H01F 38/14 307/104 |
| 2016/0141899 A1* | 5/2016 | Oo | ........................ | H02J 7/0044 320/108 |
| 2016/0315481 A1* | 10/2016 | Lee | ........................ | H02J 7/025 |

* cited by examiner

*Primary Examiner* — Jared Fureman
*Assistant Examiner* — Esayas Yeshaw
(74) *Attorney, Agent, or Firm* — Tung & Associates

(57) ABSTRACT

The present invention discloses a wireless power transfer system having positioning function, and a positioning device and a method therefor. In the positioning method, a power transmission side keeps generating a stable power; a power receiving side is moved relatively to the power transmission side and generates a corresponding induced voltage. An indication signal related to the induced voltage is generated by detecting the induced voltage, and the indication signal provides a suggestion to a user as to how the power receiving side should be moved relatively to the power transmission side to be closer to an optimal power transfer position.

15 Claims, 6 Drawing Sheets

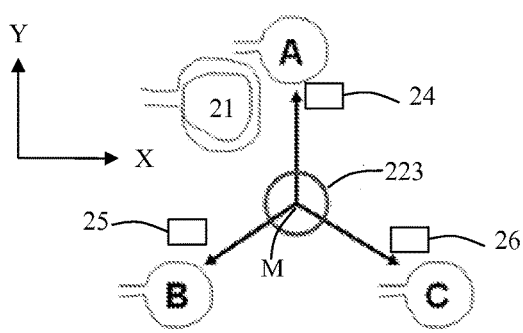
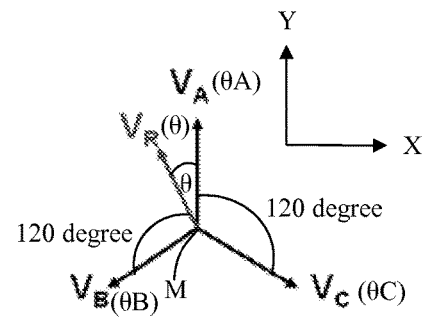
Fig. 9A    Fig. 9B
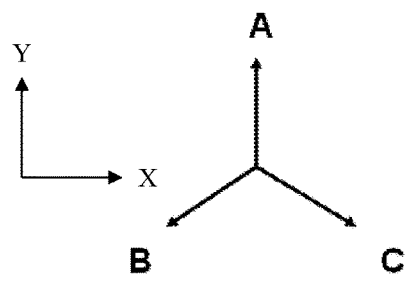
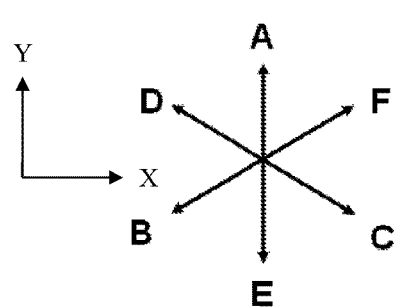
Fig. 10A    Fig. 10B
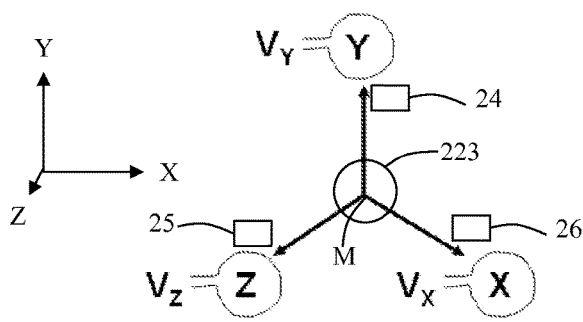
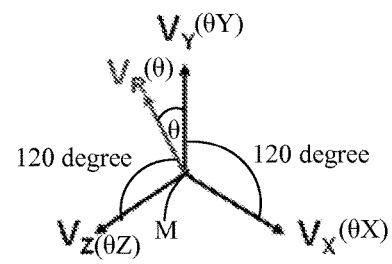
Fig. 11A    Fig. 11B

WIRELESS POWER TRANSFER SYSTEM HAVING POSITIONING FUNCTION AND POSITIONING DEVICE AND METHOD THEREFOR

BACKGROUND OF THE INVENTION

Field of Invention

The present invention relates to a wireless power transfer system having positioning function, and a positioning device and a positioning method therefor; particularly, it relates to such a wireless power transfer system which is capable of locating the most efficient power transfer position, and a positioning device and a positioning method therefor.

Description of Related Art

Conventionally, in a wireless charging system, there are two approaches to align a transmission coil of a power transmission side with a receiving coil of a power receiving side. The first prior art approach is shown in FIG. 1. An identifiable mark 13 is provided on a charger plate 14. Ideally, such identifiable mark 13 is located above the center of the transmission coil 12 of the power transmission side. However, during assembly, this identifiable mark 13 may not be precisely aligned to the center of the transmission coil 12. Besides, usually, the location of the receiving coil of the power receiving side (e.g., a portable electronic device) is not provided with any mark, so it is difficult for a user to align the transmission coil with the receiving coil by this prior art approach.

In the second prior art approach, a magnet is added at the power transmission side, for attracting a ferromagnetism material provided at the power receiving side. However, the effect of this approach is limited when the power receiving side has a significant size and weight. In addition, the magnet may cause an interference to the power receiving side.

In view of the above, to overcome the drawbacks in the prior art approaches, the present invention proposes a wireless power transfer system, and a positioning device and a positioning method therefor, which are capable of locating the most efficient power transfer position.

SUMMARY OF THE INVENTION

From one perspective, the present invention provides a wireless power transfer system, comprising: a power transmission side for receiving an input voltage, wherein the power transmission side includes: a transmission coil; and a transmission side controller coupled to the transmission coil, for controlling a power through the transmission coil; and a power receiving side, which is movable relatively to the power transmission side, wherein the power receiving side includes: a receiving coil for receiving the power from the transmission coil by electromagnetic interaction, to generate an induced voltage; a voltage regulator for converting the induced voltage or a rectified voltage generated by rectifying the induced voltage to an output voltage; and a receiving side controller coupled to the voltage regulator, for controlling a voltage regulation operation of the voltage regulator; wherein when the power receiving side is moved relatively to the power transmission side, the receiving side controller issues an indication signal indicating a variation of the induced voltage.

In one embodiment, the wireless power transfer system further comprises an indicator device for giving a user a movement suggestion according to the indication signal.

In one embodiment, when the variation of the induced voltage is within a predetermined voltage variation range for a time period equal to or longer than a predetermined time period, the indication signal shows that the power receiving side is at an optimal or a relatively better power transfer position relatively to the power transmission side.

In one embodiment, when the variation of the induced voltage is within a predetermined voltage variation range for a time period equal to or longer than a predetermined time period, and when a difference between the induced voltage and a high voltage threshold is smaller than a predetermined difference, the indication signal shows that the power receiving side is at an optimal or a relatively better power transfer position relatively to the power transmission side.

From another perspective, the present invention provides a positioning method for wireless power transfer, for use in a wireless power transfer system, wherein the wireless power transfer system comprises a power transmission side and a power receiving side, the power transmission side generating a stable power, the power receiving side sensing the power generated from the power transmission side to generate an induced voltage, and the power receiving side being movable relatively to the power transmission side, the positioning method comprising the steps of: detecting the induced voltage to generate an indication signal related to the induced voltage; and determining whether a variation of the induced voltage is within a predetermined voltage variation range for a time period equal to or longer than a predetermined time period.

In one embodiment, when the variation of the induced voltage is within a predetermined voltage variation range for a time period equal to or longer than a predetermined time period, an indication signal is issued which shows that the power receiving side is at an optimal or a relatively better power transfer position relatively to the power transmission side.

In one embodiment, the positioning method for wireless power transfer further comprises: determining whether a difference between the induced voltage and a high voltage threshold is smaller than a predetermined difference.

In one embodiment, the positioning method for wireless power transfer further comprises: when the variation of the induced voltage is within a predetermined voltage variation range for a time period equal to or longer than a predetermined time period, and when a difference between the induced voltage and a high voltage threshold is smaller than a predetermined difference, issuing an indication signal showing that the power receiving side is at an optimal or a relatively better power transfer position relatively to the power transmission side.

From yet another perspective, the present invention provides a positioning system for wireless power transfer, for use in a wireless power transfer system, wherein the wireless power transfer system comprises a power transmission side and a power receiving side, the power transmission side generating a stable power, the power receiving side receives the power generated from the power transmission side via a receiving coil to generate an induced voltage, the power receiving side being movable relatively to the power transmission side, the positioning system for wireless power transfer comprising: a plurality of detectors, which are at predetermined positions relatively to the receiving coil respectively, for detecting the power generated from the power transmission side and generating a plurality of corresponding sensed induced voltages; and a vector computation circuit for computing to generate corresponding sensed induced voltage vectors according to the sensed induced voltages and relationships between each of the sensed induced voltages and the receiving coil, and providing a suggestion as to how the power receiving side should be moved relatively to the power transmission side to be closer to an optimal power transfer position.

In one embodiment, the vector computation circuit sums the sensed induced voltage vectors to generate a positioning vector which shows a direction and a distance from the current position of the power receiving side to the optimal power transfer position.

In one embodiment, the vector computation circuit generates an indication signal according to a comparison among magnitudes of the sensed induced voltage vectors, and the indication signal shows a direction and a distance from the current position of the power receiving side to the optimal power transfer position.

In one embodiment, the positioning system is applied to two-dimensional positioning or three-dimensional positioning.

In one embodiment, the detectors are symmetrically disposed along a circumference of a circle with the receiving coil being at a center of the circle.

From still another perspective, the present invention provides a positioning method for wireless power transfer, for use in a wireless power transfer system, wherein the wireless power transfer system comprises a power transmission side and a power receiving side, the power transmission side generating a stable power, the power receiving side receives the power generated from the power transmission side via a receiving coil to generate an induced voltage, the power receiving side being movable relatively to the power transmission side, the positioning method comprising the steps of: detecting the power generated from the power transmission side to generate a plurality of sensed induced voltages at a plurality of predetermined positions relatively to the receiving coil respectively; generating corresponding sensed induced voltage vectors according to the sensed induced voltages and relationships between each of the sensed induced voltages and the receiving coil; and generating an indication signal according to the sensed induced voltage vectors, to provide a suggestion as to how the power receiving side should be moved relatively to the power transmission side to be closer to an optimal power transfer position.

In one embodiment, the step of generating the indication signal according to the sensed induced voltage vectors includes: summing the sensed induced voltage vectors to generate a positioning vector which shows a direction and a distance from the current position of the power receiving side to the optimal power transfer position, wherein the indication signal is generated according to the positioning vector.

In one embodiment, the step of generating the indication signal according to the sensed induced voltage vectors includes: generating the indication signal according to a comparison among magnitudes of the sensed induced voltage vectors, and the indication signal shows a direction and a distance from the current position of the power receiving side to the optimal power transfer position.

In one embodiment, the step of computing and generating the indication signal according to the sensed induced voltage vectors includes: summing all sensed induced voltage vectors to generate a positioning vector, thus showing a direction and a distance of the optimal power transfer position with respect to a relative position as to where the power receiving side is with respect to the power transmission side, wherein the indication signal is generated according to the positioning vector.

The objectives, technical details, features, and effects of the present invention will be better understood with regard to the detailed description of the embodiments below, with reference to the attached drawings.

BRIEF DESCRIPTION OF THE DRAWINGS

FIGS. 9A-9B show how the present invention generates a positioning vector in a two-dimensional coordinate plane system.

FIGS. 10A-10B show several embodiments as to a direction where the power receiving side should move toward.

FIGS. 11A-11B show how the present invention generates a positioning vector in a three-dimensional coordinate space system.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the components and devices, but not drawn according to actual scale.

Figure 1:
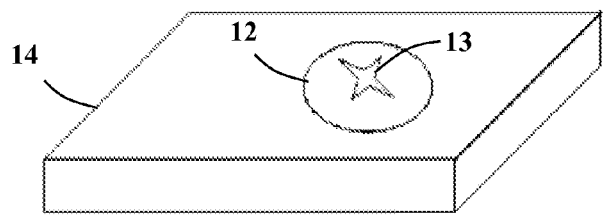
FIG. 1 shows a schematic diagram of a conventional charger plate.
Figure 2:
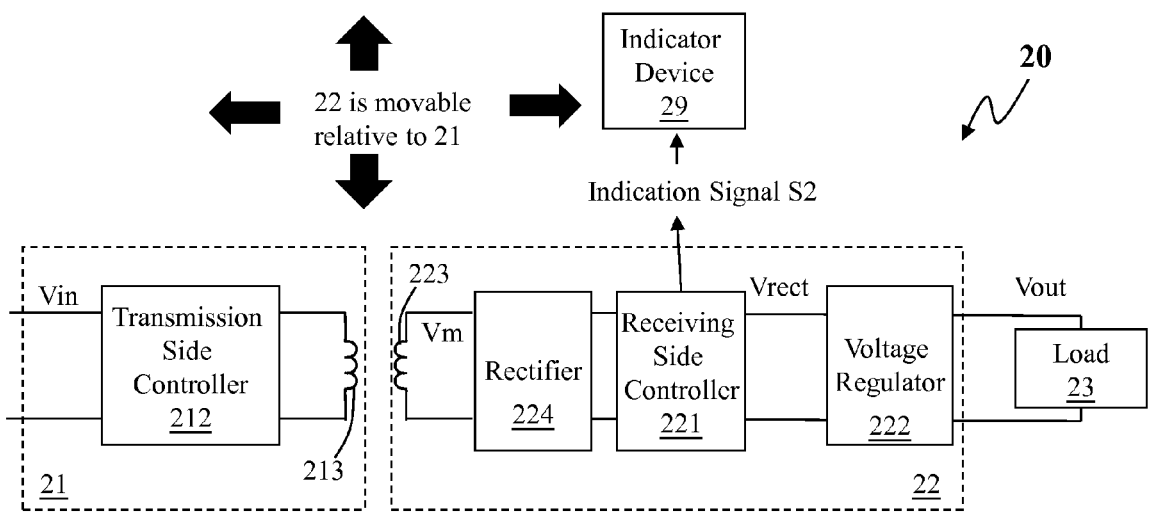
FIG. 2 shows a block diagram of a wireless power transfer system having positioning function according to an embodiment of the present invention.

Please refer to FIG. 2. FIG. 2 shows a block diagram of a positioning system for wireless power transfer according to an embodiment of the present invention. The wireless power transfer system having positioning function comprises a power transmission side 21 and a power receiving side 22. The power transmission side 21 can be installed in, for example but not limited to, a wireless charger. The power receiving side 22 can be installed in, for example but not limited to, an electronic device to be charged. The electronic device can be, for example but not limited to, a portable electronic device.

The power transmission side 21 comprises a transmission side controller 212 and a transmission coil 213. The transmission side controller 212 is coupled to the transmission coil 213, for controlling the power through the transmission coil 213. The power receiving side 22 includes a receiving coil 223, a receiving side controller 221 and a voltage regulator 222; it can optionally include a rectifier 224. The receiving side controller 221 is coupled to the voltage regulator 222, for controlling the voltage regulation operation of the voltage regulator 222. Power is first transmitted through transmission coil 213 of the power transmission side 21, and then to the receiving coil 223 of the power receiving side 22 by electromagnetic induction. Next, the power is delivered to a load 23 connected to the power receiving side 22 by providing the load 23 with an output voltage Vout. More specifically, the power transmission side 21 receives an input voltage Vin, and the electromagnetic interaction between the transmission coil 213 and the receiving coil 223 converts the input voltage Vin to an induced voltage Vm. When there is a rectifier 224, the rectifier 224 converts the induced voltage Vm to a rectified voltage Vrect. The receiving side controller 221 controls the voltage regulator 222 to convert the rectified voltage Vrect to the output voltage Vout. In addition, the receiving side controller 221, by detecting the induced voltage Vm or the rectified voltage Vrect, can judge whether the wireless power transfer is performed at an optimal (or relatively better) position.

Figure 3:
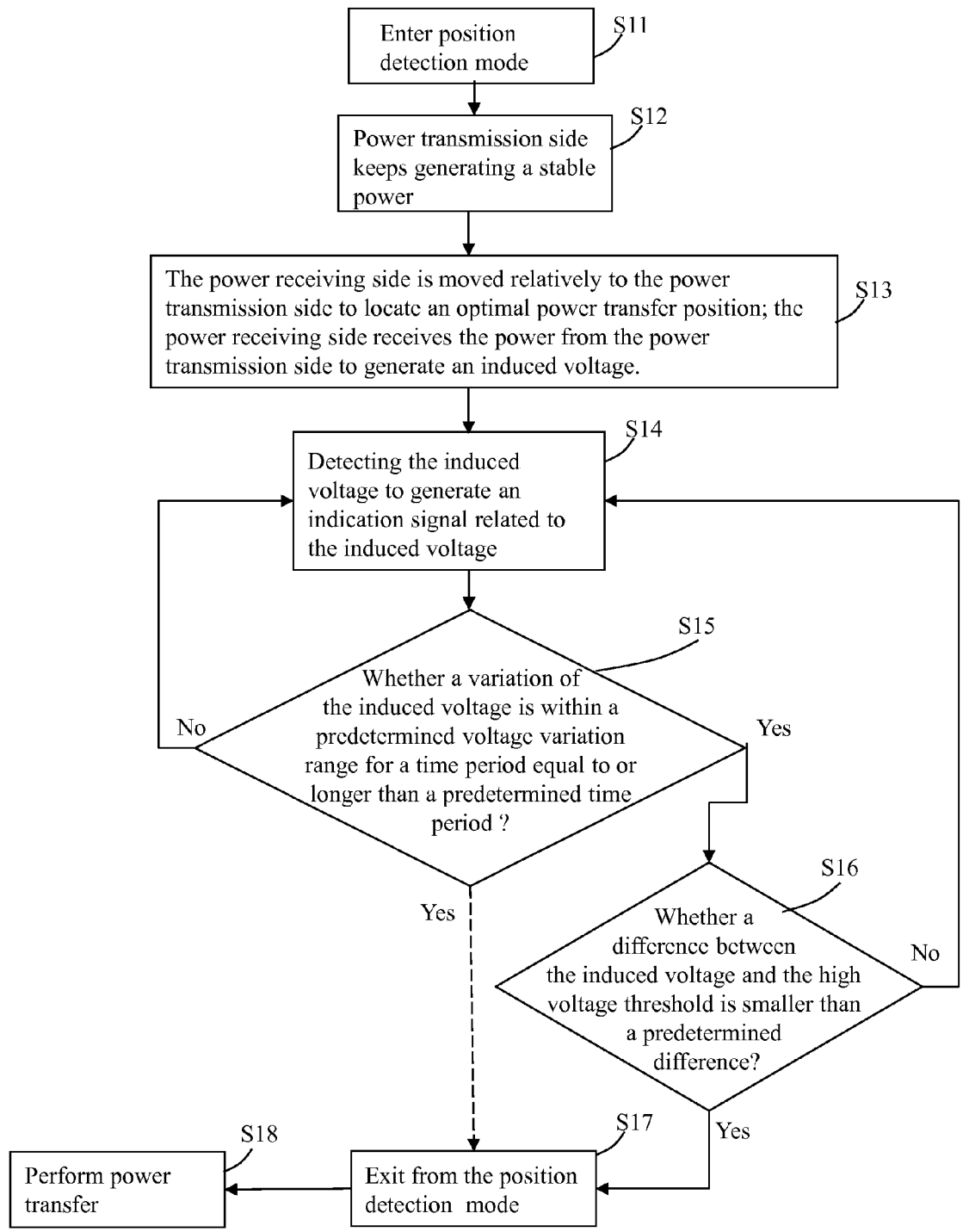
FIG. 3 shows a flow chart of a positioning method for wireless power transfer according to an embodiment of the present invention.

Please refer to both FIG. 2 and FIG. 3. FIG. 3 shows a flow chart of a positioning method for wireless power transfer according to an embodiment of the present invention. At the beginning of charging, the wireless power transfer system 20 will first enter a position detection mode (step S11). The timing as to when the wireless power transfer system 20 is triggered to enter the position detection mode for example can be determined by: when the power transmission side 21 detects the existence of a power receiving side 22; when the power transmission side 21 receives a signal transmitted from the power receiving side 22; or after an authentication of a user's identification. After entering the position detection mode, the transmission side controller 212 controls the power transmission side 21 to keep generating a stable power (step S12). This stable power does not need to be and can be smaller than (but certainly can be) an optimal power during the normal charging operation.

Next, in step S13, the power receiving side 22 is moved relatively to the power transmission side 21, so as to locate an optimal (or relatively better) power transfer position. (The moving directions shown in FIG. 2 are for illustration to show that the power receiving side 22 can be moved relatively to the power transmission side 21; FIG. 2 does not imply that there are only four possible directions.) The "power transfer position" is the relative position between the power receiving side 22 and the power transmission side 21 or the relative position between the receiving coil 223 and the transmission coil 213.

An electromagnetic interaction will occur between the transmission coil 213 and the receiving coil 223. Thus, the receiving coil 223 receives the power from the power transmission side 21 to correspondingly generate an induced voltage Vm. The induced voltage Vm will vary as the position of the power receiving side 22 changes. As a result, the rectified voltage Vrect generated based on the induced voltage Vm will also vary.

The receiving side controller 221 detects the induced voltage Vm or the rectified voltage Vrect and generates an indication signal S2 related to the level of the induced voltage Vm (or the level of the rectified voltage Vrect) (step S14). Thus, as the power receiving side 22 moves relatively to the power transmission side 21, the indication signal S2 can show a variation of the induced voltage Vm (or a variation of the rectified voltage Vrect), such that a user can be aware of the current status of the induced voltage Vm (or the rectified voltage Vrect), i.e., aware of whether the power receiving side 22 is moved to an optimal or (a relatively better) power transfer position with respect to the power transmission side 21. Because the rectified voltage Vrect is related to the induced voltage Vm, to detect either the induced voltage Vm or the rectified voltage Vrect will provide the same effect.

In one embodiment, the receiving side controller 221 can be connected wiredly or wirelessly to an indicator device 29, which can be for example but not limited to a light emitting diode (LED), an audio sound generator or a display unit, indicating how a user should move the power receiving side 22. When the indicator device 29 is an LED, the indication signal S2 for example can control the lighting frequency, brightness or color of the LED. The indicator device 29 for example can be a device which is typically installed in the portable electronic device, or a device installed in the power transmission side 21.

Figure 4:
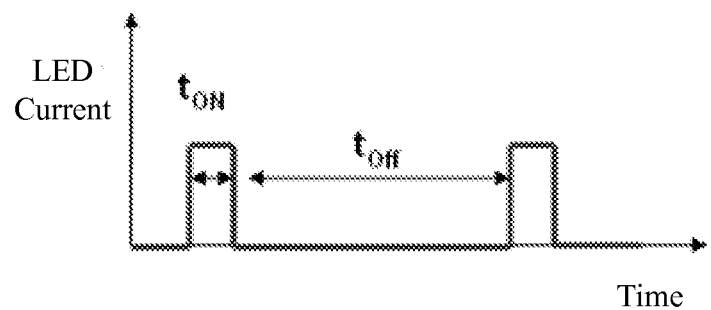
FIG. 4 shows an embodiment of the frequency of light emitting diode (LED).

Please refer to FIG. 4, which shows an embodiment wherein the indication signal S2 is used to control the lighting frequency of an LED. In FIG. 4, an ON-time tON of the LED or an OFF-time tOff of the LED can be adjusted according to the indication signal S2. For example, when the ON-time tON of the LED is fixed, one can adjust the lighting frequency of the LED by changing the OFF-time tOff of the LED. For example, the lighting frequency of the LED is relatively higher as the induced voltage Vm or the rectified voltage Vrect is relatively higher. In another embodiment, one can adjust the lighting frequency of the LED by adjusting the ON-time tON of the LED while the OFF-time tOff of the LED is fixed. Or, in still another embodiment, one can adjust a current level of the LED in response to the indication signal S2, so that the brightness of the LED corresponds to the indication signal S2.

In other embodiments, when the indicator device 29 is an audio sound generator or a display unit, the indication signal S2 can be a signal capable of controlling the sound or the displayed image of the display unit.

Figure 5:
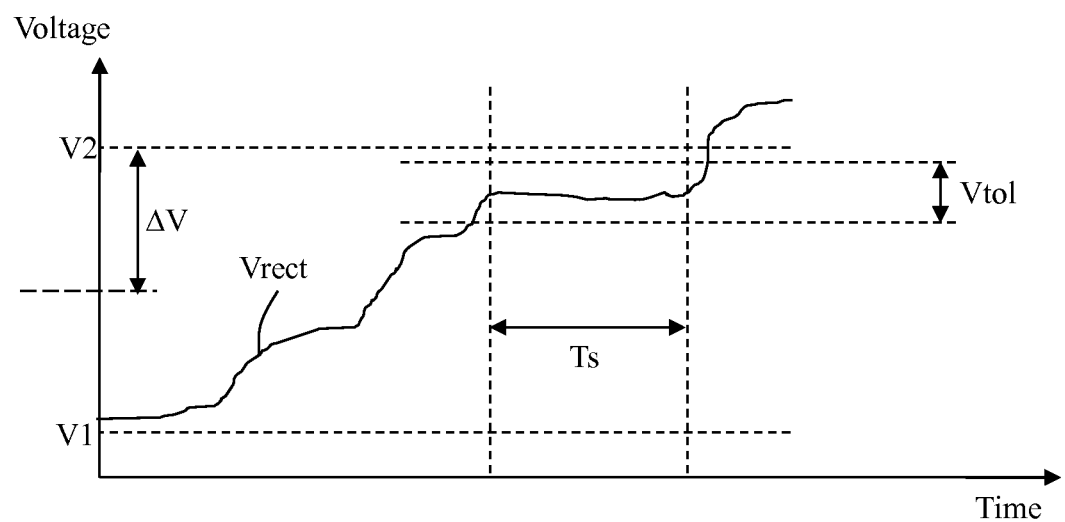
FIG. 5 shows a relationship between the rectified voltage and time.

In one embodiment of the present invention, the wireless power transfer system can simply perform the step S11-S14, whereas in another embodiment, the wireless power transfer system can further proceed to perform the step S15. Please refer to FIG. 5, which shows an example as to how to locate an optimal (or relatively better) wireless power transfer position by a variation of the rectified voltage Vrect over time (as explained in the above, because the rectified voltage Vrect is related to the induced voltage Vm, to detect either the induced voltage Vm or the rectified voltage Vrect will provide the same effect. Therefore, the induced voltage Vm in FIG. 3 corresponds to the rectified voltage Vrect in the embodiment of FIG. 5). As shown in FIG. 5, when the receiving coil 223 is moved relatively to the power transmission side 21, the generated rectified voltage Vrect will vary as the distance between the receiving coil 223 and the transmission coil 213 varies. In this example, at the very beginning, the receiving coil 223 is not put at a suitable position, so the rectified voltage Vrect is at a relatively low level. As the time goes by, the user gradually moves the receiving coil 223 to a relatively better power transfer position. In FIG. 5, V1 is a low voltage threshold during the detection period of the rectified voltage Vrect, while V2 is a high voltage threshold during the detection period of the rectified voltage Vrect.

Please refer to FIG. 2 and FIG. 3 in conjugation with FIG. 5. In this embodiment, in the step S15, it is determined whether a variation of the rectified voltage Vrect (e.g. over a unit time, which is hereinafter denoted as ΔVrect) caused by the movement of the receiving coil 223 is within a predetermined voltage variation range Vtol (i.e., whether ΔVrect is smaller than Vtol), and whether a time period wherein the voltage variation ΔVrect is within the predetermined voltage variation range Vtol is equal to or longer than a predetermined time period Ts (i.e., it is determined whether a variation of the induced voltage is smaller than the predetermined voltage variation range Vtol for a time period equal to or longer than the predetermined time period Ts). If any of the two determinations is no, the process flow returns to the step S14. If both determinations are yes, in one embodiment as shown by the dash line, the present invention can exit from the position detection mode (the step S17) and proceed to perform the power transfer (the step S18). In another embodiment, the present invention can proceed to the step S16, to check whether a difference between the rectified voltage Vrect and a high voltage threshold is smaller than a predetermined difference. That is, the present invention checks whether V2−Vrect<ΔV. If it is determined yes, the present invention will then exit from the position detection mode (the step S17) and proceed to perform the power transfer (the step S18). The above steps mean that: if the voltage variation ΔVrect is smaller than the predetermined voltage variation range Vtol for a time period equal to or longer than a predetermined time period Ts, it indicates that the power transfer position has already been stable, which usually reflects that the power transfer position is at the optimal or relatively better power transfer position. However, it is also possible that the user does not move the power receiving side 22 relatively to the power transmission side 21 simply because he is busy in something else. To cope with it, the step S16 provides another check to ensure that the relative position between the power receiving side 22 and the power transmission side 21 is located at the optimal or relatively better power transfer position. When it is OK to exit from the position detection mode (the step S17), this information can be expressed by for example but not limited to the indication signal S2 which controls the indicator device 29 to show a corresponding message.

After entering the step S18, the wireless power transfer system 20 can perform highly efficient power transfer at the optimal power transfer position. Under such circumstance, because the wireless power transfer system 20 has exited from the position detection mode, the power transfer can now be controlled by an open-loop or a closed-loop control mechanism which is different from the mechanism in the position detection mode. For example, the maximum of the rectified voltage Vrect is no longer limited to the high voltage threshold V2 during the position detection mode (as indicated by the right part of FIG. 5).

Figure 6:
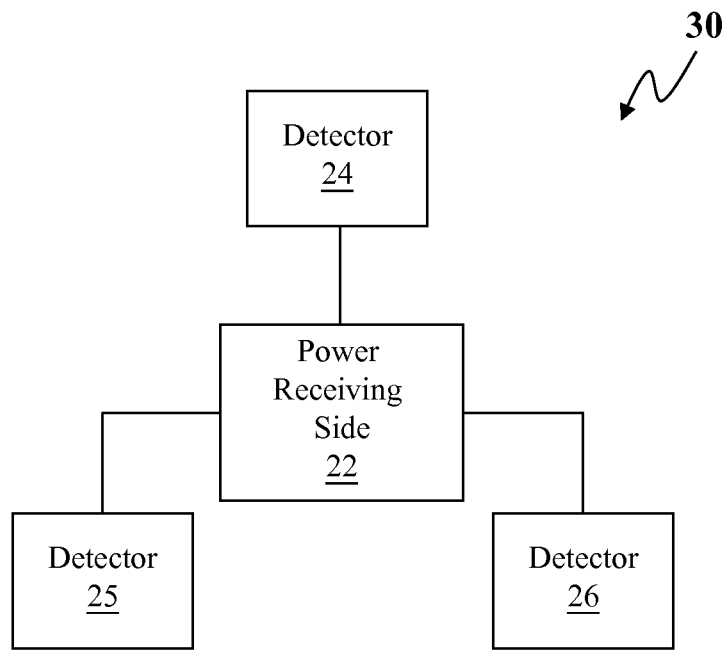
FIG. 6 shows a block diagram of a positioning system of a wireless power transfer system according to another embodiment of the present invention.

Please refer to FIG. 6, which shows a block diagram of a positioning system for wireless power transfer according to another embodiment of the present invention. The positioning system 30 for wireless power transfer includes the power receiving side 22 (or the receiving coil 223) as described in the above-mentioned embodiment; in addition, the positioning system 30 further includes plural (for example but not limited to three) detectors 24, 25, 26. Each of the detectors 24, 25, 26 for example can be, but not limited to, a coil or a magnetic field detector device, such as a Hall device. As shown in FIG. 6, in one embodiment, the number of the detectors 24, 25, 26 is for example three. In other embodiments, the number of the detectors can be two, three or any integer above three. The detectors 24, 25, 26 are located near and around the receiving coil 223 of the power receiving side 22. And, the relative relationships between the position of each of the detectors 24, 25, 26 and the position of the receiving coil 223 are known (i.e., the detectors 24, 25, 26 are at fixed predetermined positions with respect to the receiving coil 223). For simplicity, hereinafter it is assumed that the number of the detectors 24, 25, 26 is three, and the detectors 24, 25, 26 are symmetrically disposed along a circumference of a circle with the receiving coil 223 being at the center of the circle. Certainly, it is still practicable and within the scope of the present invention if the number of the detectors is not three, or the detectors 24, 25, 26 are not symmetrically disposed along a circumference of a circle with the receiving coil 223 being at the center of the circle.

Figure 7:
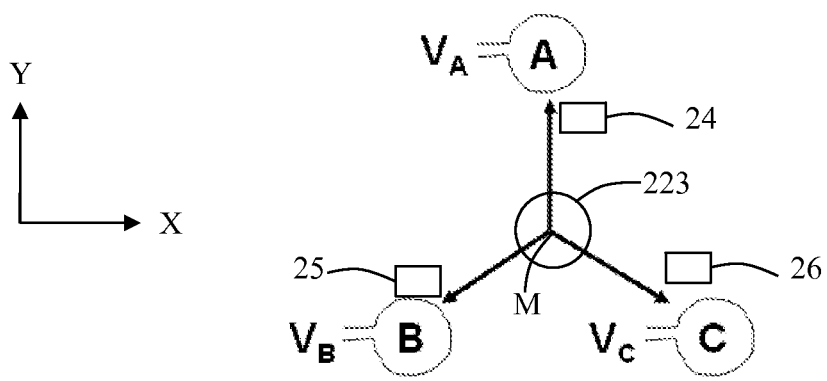
FIG. 7 shows an embodiment wherein a receiving coil of a power receiving side is located at a center of an imaginary shape formed by detectors in a coordinate system.
Figure 8:
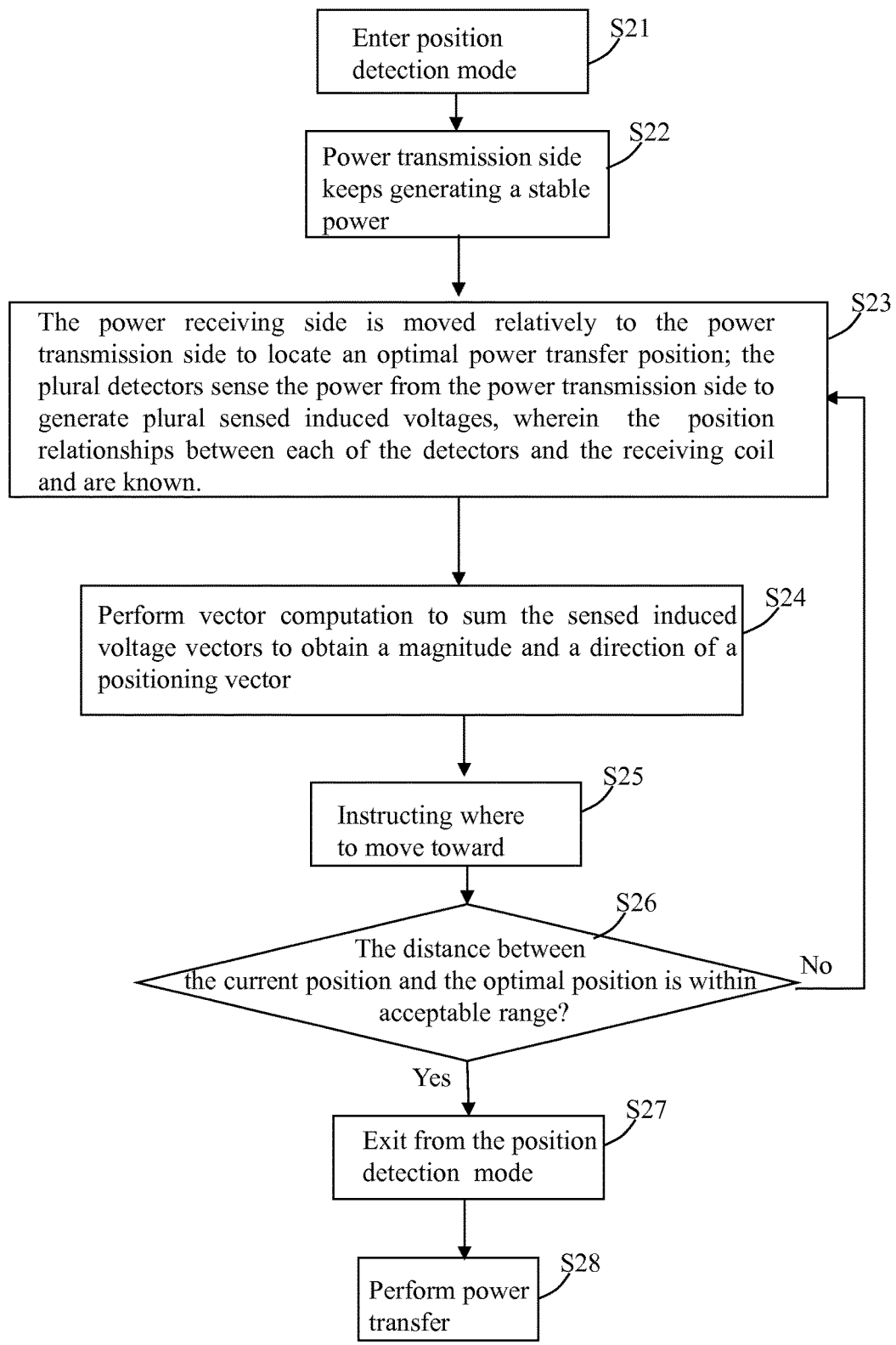
FIG. 8 shows a flow chart of a positioning method for wireless power transfer according to another embodiment of the present invention.

Please refer to both FIG. 7 and FIG. 8. FIG. 7 illustrates how the optimal or relatively better power transfer position is identified. FIG. 8 shows a flow chart of a positioning method for wireless power transfer according to another embodiment of the present invention. To start, when the positioning system 30 for wireless power transfer enters a position detection mode (the step S21), the power transmission side controller 212 controls the power transmission side 21 to keep generating a stable power (the step S22). The relevant details of the step S22 are similar to what are described with reference to FIG. 3.

Next, the power receiving side 22 is moved relatively to the power transmission side 21, to locate an optimal or relatively better power transfer position. In this embodiment, the relative movement of the power receiving side 22 with respect to the power transmission side 21 can be assisted by the detectors 24, 25, 26. In this embodiment, for example, the detectors 24, 25, 26 are symmetrically disposed along a circumference of a circle with the receiving coil 223 being at the center of the circle. Or, in other words, the receiving coil 223 is at a center of an imaginary shape formed by the detectors 24, 25, 26 in a coordinate system (the two-dimensional coordinate plane system shown in FIG. 7). The detector 24 is at the point A in FIG. 7; the detector 25 is at the point B in FIG. 7; the detector 26 is at the point C in FIG. 7. In this embodiment, the imaginary shape formed by the point A, point B and point C is for example but not limited to a regular triangle. And, the receiving coil 223 is at the center M of this regular triangle, as shown in FIG. 7. When the transmission coil 213 of the power transmission side 21 generates power near this regular triangle, each respective detector 24, 25, 26 will sense a corresponding induced voltage (the step S23). VA represents a sensed induced voltage detected by the detector 24 at the point A, which has a sensed induced voltage vector VA(ΘA). VB represents a sensed induced voltage detected by the detector 25 at the point B, which has a sensed induced voltage vector VB(ΘB). VC represents a sensed induced voltage detected by the detector 26 at the point C, which has a sensed induced voltage vector VC(ΘC).

As such, by the readouts of the detectors 24, 25, 26, the direction and the distance as to how the power receiving side 22 should be moved relatively to power transmission side can be determined. The details as to how the power receiving side 22 should be moved relatively to power transmission side 21 will be described below by examples.

Please refer to FIGS. 9A-9B in conjugation with FIGS. 6-8. FIGS. 9A-9B show how the present invention generates a positioning vector in a two-dimensional coordinate plane system. The vector computation can be conducted by for example but not limited to the receiving side controller 221. Certainly, it can also be conducted by another processor.

As shown in FIG. 9A, when the power transmission side 21 generates power near the regular triangle, each respective detector 24, 25, 26 will sense a corresponding sensed induced voltage (the step S23). Next, as shown in FIG. 9B, the sensed induced voltage vectors are summed to generate a positioning vector VR(Θ) (the step S24). In this embodiment, the positioning vector VR(Θ) is calculated as the following:

$$VR(\Theta)=VA(\Theta A)+VB(\Theta B)+VC(\Theta C) \quad \text{Equation 1}$$

wherein VR(Θ) denotes the positioning vector; Θ denotes an angle of the positioning vector; VA(ΘA), VB(ΘB) and VC(ΘC) denote the sensed induced voltage vectors of the sensed induced voltages VA, VB and VC, respectively; and ΘA, ΘB and ΘC denote the angles of the sensed induced voltage vectors, respectively.

In one embodiment, for example but not limiting, ΘA can be set as zero degree. As shown in FIG. 9B, because the imaginary shape formed by the point A, point B and point C is a regular triangle, ΘC is 0 degree+120 degree=120 degree, and ΘB is 0 degree−120 degree=−120 degree.

Consequently, as shown in FIG. 9B, the direction and magnitude of the positioning vector VR(Θ) can be obtained (the step S24). If the positioning vector VR(Θ) is not equal to zero, the positioning vector VR(Θ) can show the direction and distance that the power receiving side 22 should be moved relatively to the power transmission side 21. If the positioning vector VR(Θ) is equal to zero, the power transfer position is at the optimal position. In one embodiment, the direction and distance that the power receiving side 22 should be moved relatively to the power transmission side 21 can be expressed by the indicator device 29 (referring to FIG. 2) (the step S26).

Note that, even if the positioning vector VR(Θ) is not equal to zero, as long as the distance between the power transfer position and the optimal position is smaller than a predetermined value, it can be regarded as that the positioning process is successfully accomplished, and the process can exit from the position detection mode. Because the power receiving side 22 is now at an optimal power transfer position relatively to the power transmission side 21, the wireless power transfer system 20 can perform power transfer highly efficiently at the optimal power transfer position (the step S28).

Note that the numerical values of the angles described in this embodiment are for illustrative purpose only, but not for limiting the scope of the present invention. In other embodiments, ΘA, ΘB and ΘC can be any other angles, and the positioning vector VR(Θ) can still be obtained.

Moreover, in other embodiments, the imaginary shape formed by the point A, point B and point C is not limited to a regular triangle, but can be any other imaginary shape.

In other embodiments, when the power receiving side 22 (or the receiving coil 223) is not at the center M of the above-mentioned regular triangle, or when the imaginary shape formed by the point A, point B and point C is another type of triangle instead of a regular triangle, a calibration procedure can be performed first to obtain a compensation vector VRcmp(Θ). The equation to obtain the positioning vector VR(Θ) can be modified as the following:

$$VR(\Theta)=VRcmp(\Theta)+VA(\Theta A)+VB(\Theta B)+VC(\Theta C) \quad \text{Equation 2}$$

wherein VRcmp(Θ) denotes the correction compensation vector.

Please refer to FIGS. 10A-10B, which show a positioning method for wireless power transfer according to another embodiment of the present invention.

In this embodiment, it is not required to obtain the positioning vector VR(Θ). Instead, the direction and distance that the power receiving side 22 should be moved relatively to the power transmission side 21 can be obtained according to the magnitudes VA, VB and VC of the sensed induced voltage vectors VA(ΘA), VB(ΘB), and VC(ΘC). As shown in FIGS. 10A-10B, in one embodiment, it is assumed that the imaginary shape formed by the point A, point B and point C is a regular triangle and that the power receiving side 22 (or the receiving coil 223) is at the center M of this regular triangle. Based on such assumption, when at least two of the sensed induced voltages VA, VB and VC are not equal to one another, the direction and distance that the power receiving side 22 should be moved relatively to the power transmission side 21 can be determined as the followings, referring to FIG. 10B:

When VA>VB=VC, the power receiving side 22 should be moved toward the direction indicated by the point A.

When VA<VB=VC, the power receiving side 22 should be moved toward the direction indicated by the point E.

When VB>VA=VC, the power receiving side 22 should be moved toward the direction indicated by the point B.

When VB<VA=VC, the power receiving side 22 should be moved toward the direction indicated by the point F.

When VC>VA=VB, the power receiving side 22 should be moved toward the direction indicated by the point C.

When VC<VA=VB, the power receiving side 22 should be moved toward the direction indicated by the point D.

When VA>VB>VC, the power receiving side 22 should be moved toward the direction between the point A and the point D.

When VA>VC>VB, the power receiving side 22 should be moved toward the direction between the point A and the point F.

When VB>VA>VC, the power receiving side 22 should be moved toward the direction between the point B and the point D.

When VB>VC>VA, the power receiving side 22 should be moved toward the direction between the point B and the point E.

When VC>VA>VB, the power receiving side 22 should be moved toward the direction between the point C and the point F.

When VC>VB>VA, the power receiving side 22 should be moved toward the direction between the point C and the point E.

When VA=VB=VC, the power receiving side 22 should be moved toward the direction between the point A and the point D, the power receiving side 22 is at an optimal power transfer position relatively to the power transmission side 21, which indicates that the power receiving side 22 does not need to move anymore. In other words, the positioning procedure is finished, and the process can exit from the position detection mode. Because the power receiving side 22 is now at an optimal power transfer position relatively to the power transmission side 21, the wireless power transfer system can perform the power transfer highly efficiently at the optimal power transfer position.

In another embodiment, the resolution with respect to the suggested directions can be reduced; that is, there can be only six suggested directions (A-F) (as shown in FIG. 10B) or three suggested directions (A-C) (as shown in FIG. 10A).

Please refer to FIGS. 11A-11B in conjugation with FIGS. 6-8. FIGS. 11A-11B show how the present invention generates a positioning vector in a three-dimensional coordinate space system.

In this embodiment, the coordinate system for example can be a three-dimensional coordinate space system, as shown by the X-Y-Z coordinate system in FIGS. 11A-11B. The detector 24 is at the point Y as shown in FIG. 11A; the detector 25 is at the point Z as shown in FIG. 11A; the detector 26 is at the point X as shown in FIG. 11A. In this embodiment, the relationships between each of the point X, the point Y and the point Z and the power receiving side 22 are known and can be used to define the above-mentioned X-Y-Z coordinate space system. Thus, based on the positioning method described in the aforementioned embodiments, this embodiment can position the power receiving side 22 relatively to power transmission side 21 at an optimal or relatively better power transfer position.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the detection and information obtained according to the induced voltages is equivalent to the detection and information obtained according to the rectified voltage. In view of the foregoing, the spirit of the present invention should cover all such and other modifications and variations, which should be interpreted to fall within the scope of the following claims and their equivalents.

What is claimed is:

1. A wireless power transfer system, comprising:
a power transmission side for receiving an input voltage, wherein the power transmission side includes:
a transmission coil; and
a transmission side controller coupled to the transmission coil, for controlling a power through the transmission coil; and
a power receiving side, which is movable relatively to the power transmission side, wherein the power receiving side includes:
a receiving coil for receiving the power from the transmission coil by electromagnetic interaction, to generate an induced voltage;
a voltage regulator for converting the induced voltage or a rectified voltage generated by rectifying the induced voltage to an output voltage; and
a receiving side controller coupled to the voltage regulator, for controlling a voltage regulation operation of the voltage regulator;
wherein when the power receiving side is moved relatively to the power transmission side, the receiving side controller issues an indication signal indicating a variation of the induced voltage;
wherein when the variation of the induced voltage is within a predetermined voltage variation range for a time period equal to or longer than a predetermined time period, the indication signal shows that the power receiving side is at an optimal or a relatively better power transfer position relatively to the power transmission side.

2. The wireless power transfer system of claim 1, further comprising:
an indicator device for giving a user a movement suggestion according to the indication signal.

3. A wireless power transfer system, comprising:
a power transmission side for receiving an input voltage, wherein the power transmission side includes:
a transmission coil; and
a transmission side controller coupled to the transmission coil, for controlling a power through the transmission coil; and
a power receiving side, which is movable relatively to the power transmission side, wherein the power receiving side includes:
a receiving coil for receiving the power from the transmission coil by electromagnetic interaction, to generate an induced voltage;
a voltage regulator for converting the induced voltage or a rectified voltage generated by rectifying the induced voltage to an output voltage; and
a receiving side controller coupled to the voltage regulator, for controlling a voltage regulation operation of the voltage regulator;
wherein when the power receiving side is moved relatively to the power transmission side, the receiving side controller issues an indication signal indicating a variation of the induced voltage;
wherein when the variation of the induced voltage is within a predetermined voltage variation range for a time period equal to or longer than a predetermined time period, and when a difference between the induced voltage and a high voltage threshold is smaller than a predetermined difference, the indication signal shows that the power receiving side is at an optimal or a relatively better power transfer position relatively to the power transmission side.

4. A positioning method for wireless power transfer, for use in a wireless power transfer system, wherein the wireless power transfer system comprises a power transmission side and a power receiving side, the power transmission side generating a stable power, the power receiving side sensing the power generated from the power transmission side to generate an induced voltage, and the power receiving side being movable relatively to the power transmission side, the positioning method comprising the steps of:
detecting the induced voltage to generate an indication signal related to the induced voltage; and
determining whether a variation of the induced voltage is within a predetermined voltage variation range for a time period equal to or longer than a predetermined time period.

5. The positioning method for wireless power transfer of claim 4, further comprising: when the variation of the induced voltage is within a predetermined voltage variation range for a time period equal to or longer than a predetermined time period, issuing an indication signal showing that the power receiving side is at an optimal or a relatively better power transfer position relatively to the power transmission side.

6. The positioning method for wireless power transfer of claim 4, further comprising:
determining whether a difference between the induced voltage and a high voltage threshold is smaller than a predetermined difference.

7. The positioning method for wireless power transfer of claim 6, further comprising: when the variation of the induced voltage is within a predetermined voltage variation range for a time period equal to or longer than a predetermined time period, and when a difference between the induced voltage and a high voltage threshold is smaller than a predetermined difference, issuing an indication signal showing that the power receiving side is at an optimal or a relatively better power transfer position relatively to the power transmission side.

8. A positioning system for wireless power transfer, for use in a wireless power transfer system, wherein the wireless power transfer system comprises a power transmission side and a power receiving side, the power transmission side generating a stable power, the power receiving side receives the power generated from the power transmission side via a receiving coil to generate an induced voltage, the power receiving side being movable relatively to the power transmission side, the positioning system for wireless power transfer comprising:
- a plurality of detectors, which are at predetermined positions relatively to the receiving coil respectively, for detecting the power generated from the power transmission side and generating a plurality of corresponding sensed induced voltages; and
- a vector computation circuit for computing to generate corresponding sensed induced voltage vectors according to the sensed induced voltages and relationships between each of the sensed induced voltages and the receiving coil, and providing a suggestion as to how the power receiving side should be moved relatively to the power transmission side to be closer to an optimal power transfer position.

9. The positioning system for wireless power transfer of claim 8, wherein the vector computation circuit sums the sensed induced voltage vectors to generate a positioning vector which shows a direction and a distance from the current position of the power receiving side to the optimal power transfer position.

10. The positioning system for wireless power transfer of claim 8, wherein the vector computation circuit generates an indication signal according to a comparison among magnitudes of the sensed induced voltage vectors, and the indication signal shows a direction and a distance from the current position of the power receiving side to the optimal power transfer position.

11. The positioning system for wireless power transfer of claim 8, wherein the positioning system is applied to two-dimensional positioning or three-dimensional positioning.

12. The positioning system for wireless power transfer of claim 8, wherein the detectors are symmetrically disposed along a circumference of a circle with the receiving coil being at a center of the circle.

13. A positioning method for wireless power transfer, for use in a wireless power transfer system, wherein the wireless power transfer system comprises a power transmission side and a power receiving side, the power transmission side generating a stable power, the power receiving side receives the power generated from the power transmission side via a receiving coil to generate an induced voltage, the power receiving side being movable relatively to the power transmission side, the positioning method comprising the steps of:
- detecting the power generated from the power transmission side to generate a plurality of sensed induced voltages at a plurality of predetermined positions relatively to the receiving coil respectively;
- generating corresponding sensed induced voltage vectors according to the sensed induced voltages and relationships between each of the sensed induced voltages and the receiving coil; and
- generating an indication signal according to the sensed induced voltage vectors, to provide a suggestion as to how the power receiving side should be moved relatively to the power transmission side to be closer to an optimal power transfer position.

14. The positioning method of claim 13, wherein the step of generating the indication signal according to the sensed induced voltage vectors includes:
- summing the sensed induced voltage vectors to generate a positioning vector which shows a direction and a distance from the current position of the power receiving side to the optimal power transfer position, wherein the indication signal is generated according to the positioning vector.

15. The positioning method of claim 13, wherein the step of generating the indication signal according to the sensed induced voltage vectors includes:
- generating the indication signal according to a comparison among magnitudes of the sensed induced voltage vectors, and the indication signal shows a direction and a distance from the current position of the power receiving side to the optimal power transfer position.

* * * * *